United States Patent [19]
von Kaler et al.

[11] Patent Number: 5,345,837
[45] Date of Patent: Sep. 13, 1994

[54] SHIFT LEVER ARRANGEMENT FOR TRANSAXLE

[75] Inventors: Roland L. von Kaler; Rocky H. Page, both of Tecumseh, Mich.

[73] Assignee: Tecumseh Products Company, Tecumseh, Mich.

[21] Appl. No.: 837,351

[22] Filed: Feb. 14, 1992

[51] Int. Cl.⁵ .................... F16H 3/08; B60K 20/00
[52] U.S. Cl. ...................................................... 74/475
[58] Field of Search ................ 74/475, 381; 475/206

[56] References Cited

U.S. PATENT DOCUMENTS

| | | | |
|---|---|---|---|
| Re. 32,125 | 8/1986 | Von Kaler et al. | 74/371 |
| 1,285,370 | 11/1918 | Potts | 74/371 |
| 1,740,725 | 12/1929 | Brown | 74/371 |
| 2,236,355 | 3/1941 | Russell | 74/475 |
| 2,712,857 | 7/1955 | Jackson | 475/206 X |
| 3,054,302 | 9/1962 | Cone | 74/475 |
| 4,656,886 | 4/1987 | Edwards | 74/371 |
| 4,673,055 | 6/1987 | Yamaoka et al. | 180/336 |
| 4,702,120 | 10/1987 | Okada et al. | 74/371 |
| 4,771,636 | 9/1988 | Fujita | 74/371 |
| 4,809,560 | 3/1989 | Nemoto | 74/371 |
| 4,841,794 | 6/1989 | Hikishima | 74/371 |
| 4,907,466 | 3/1990 | Kuhn | 74/371 X |
| 4,966,574 | 10/1990 | Von Kaler et al. | 74/371 X |
| 5,094,121 | 3/1992 | Von Kaler | 74/475 |
| 5,149,308 | 9/1992 | Nakamura et al. | 475/206 X |

Primary Examiner—Rodney H. Bonck
Attorney, Agent, or Firm—Baker & Daniels

[57] ABSTRACT

The present invention is a front shift arrangement for transaxles of small tractors and riding lawn mowers. In one embodiment, the shifter is a cylindrical rod having arms engaging the shift collar of an in-line transmission. One end of the shifter extends out the front of the transaxle housing and has a square head with a bore for attaching to a lever and linkage. By moving the lever and thereby pivoting the shifter, the shift collar is axially moved to selectively engage gears gear ratios of the transmission, with the shifter being releasably secured in selected positions by a detent biasing mechanism. The shifter is positioned below the central plane of the transaxle in the lower housing by a cover plate. The lever attached to the shifter moves on a vertical arc to pivot the shifter. In a second embodiment, the shifter is a flat piece which is bent to form an arm and a lever portion. The arm portion extends out an opening in the lower housing and is bent to form the lever portion which may be attached to and moved by linkage to an operator lever. A bushing pivotally supports the shifter in the opening and includes a detent biasing mechanism for releasably securing the shifter at positions which correspond to the gear ratios. A wall of the housing is positioned in front of the recesses to retain the bushing within the housing.

26 Claims, 5 Drawing Sheets

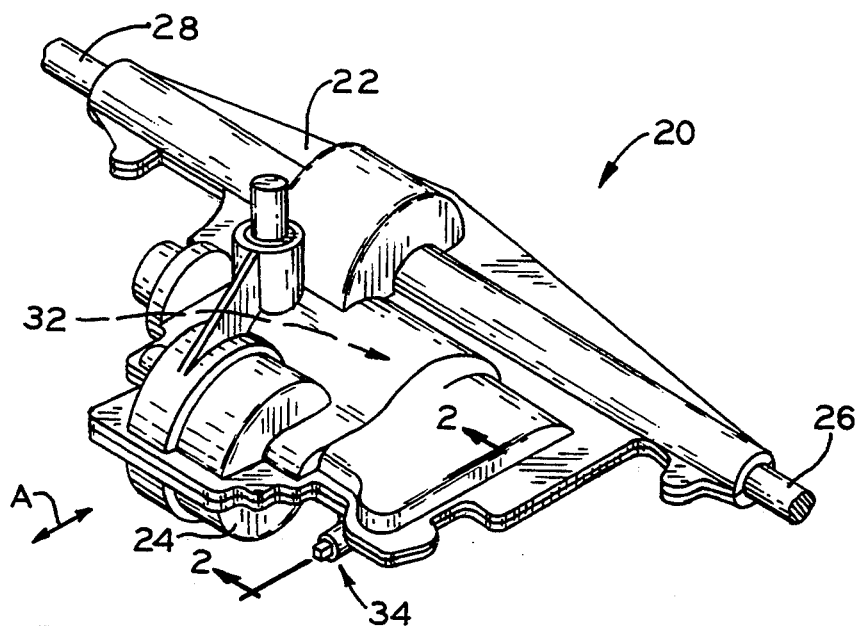
FIG_1
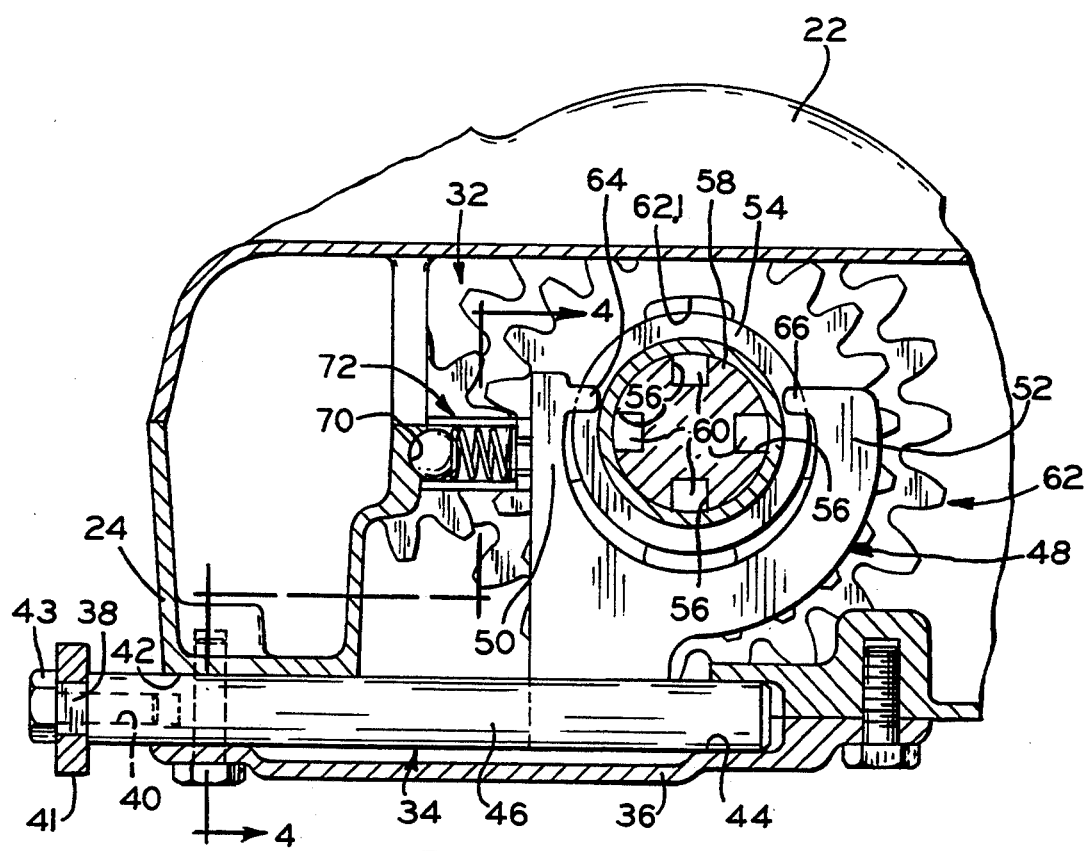
FIG_2

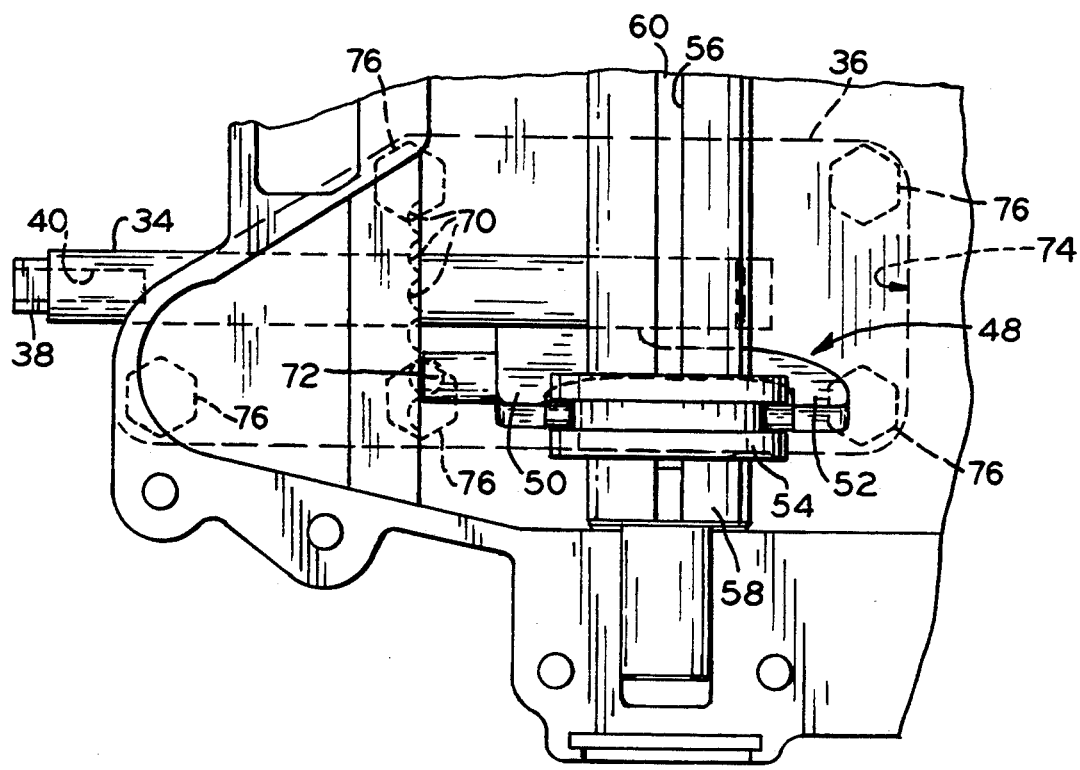
FIG_3
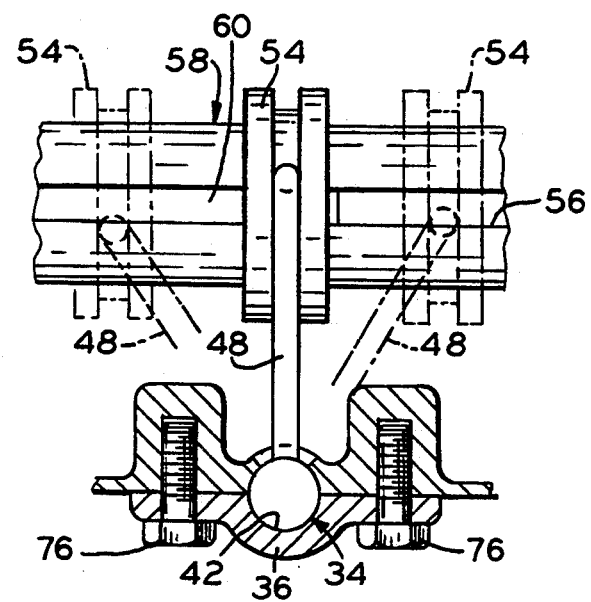
FIG_4

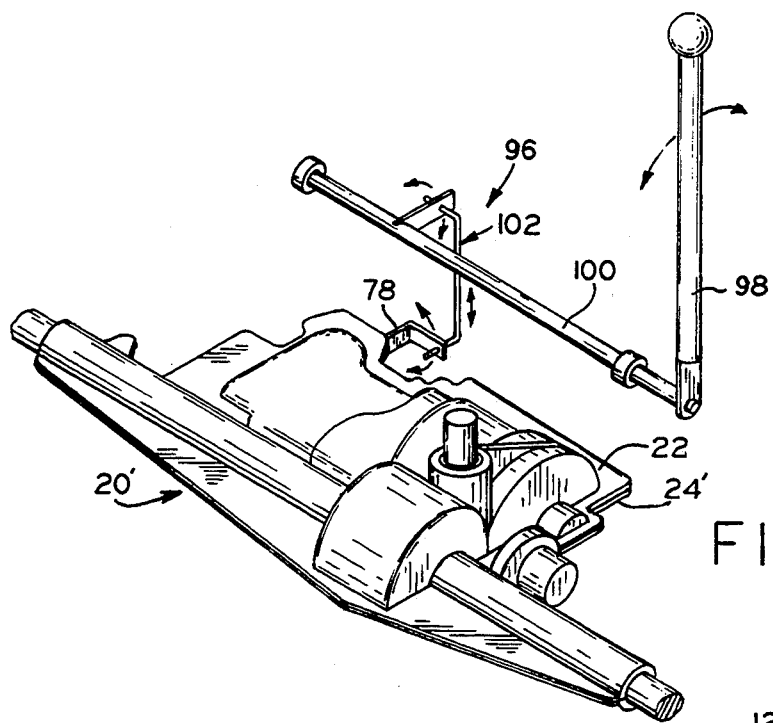
FIG_5
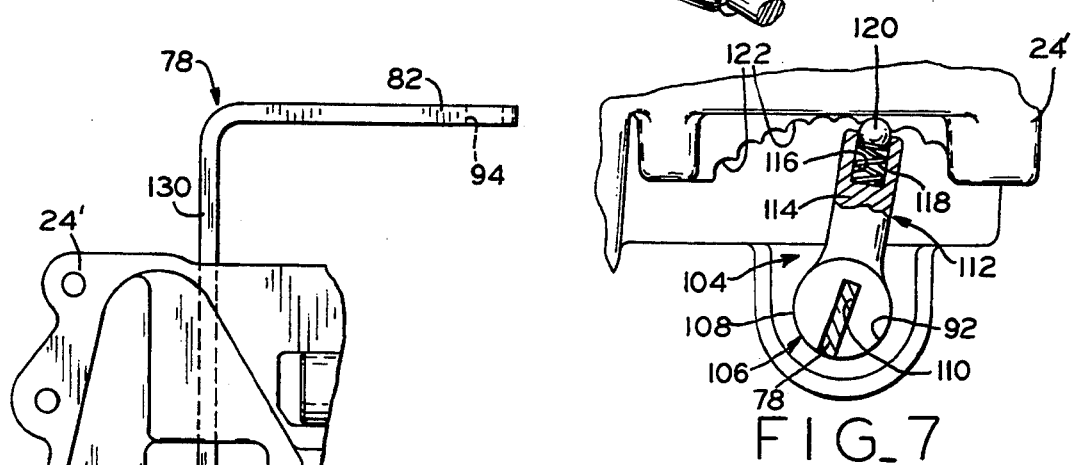
FIG_7
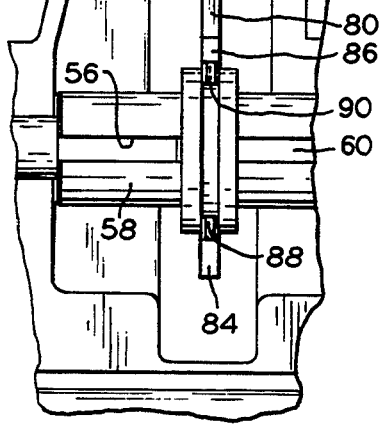
FIG_6
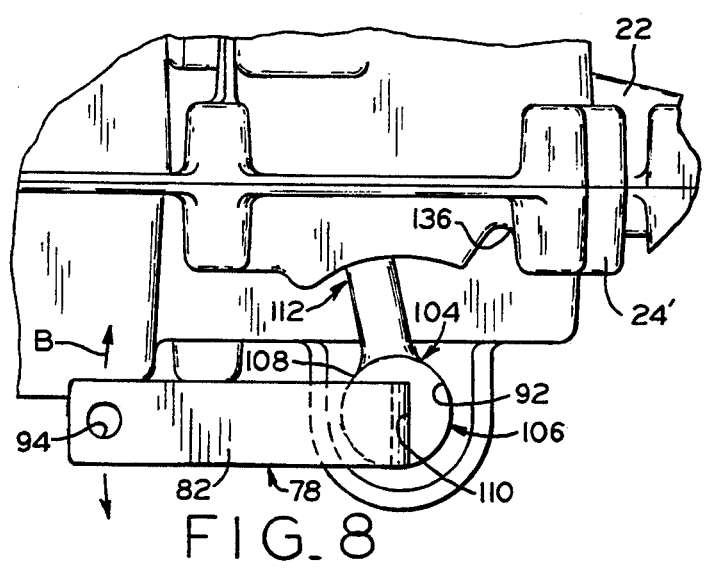
FIG_8

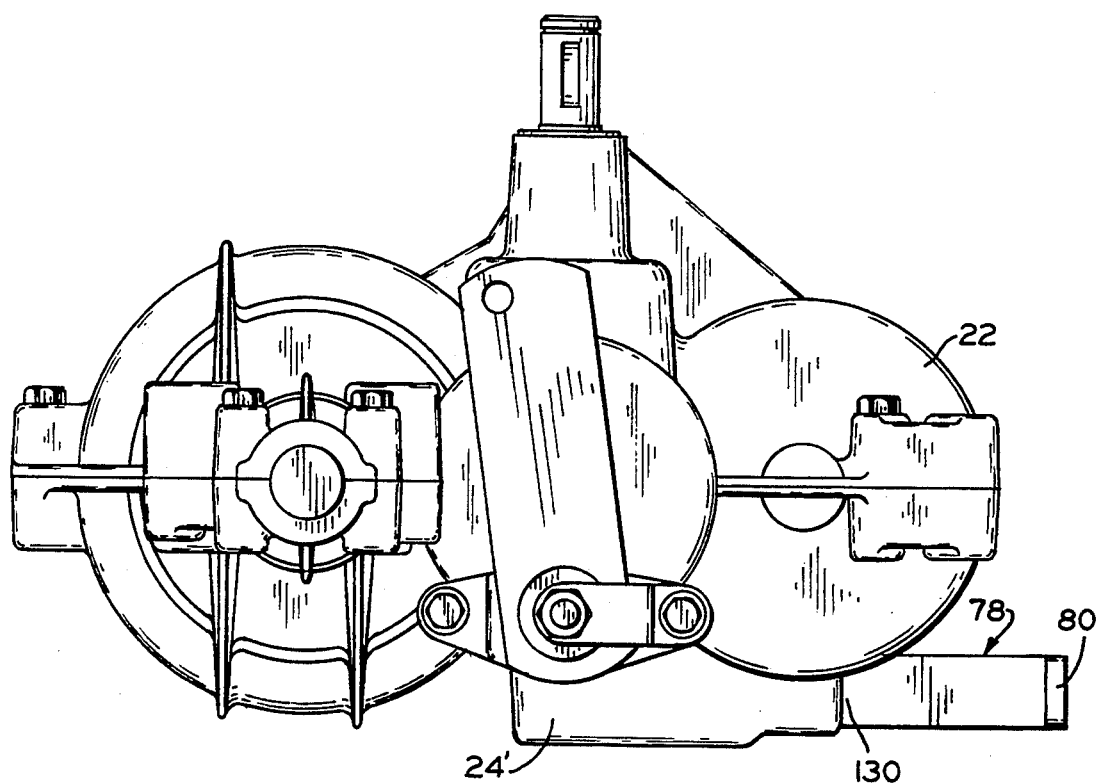
FIG_9
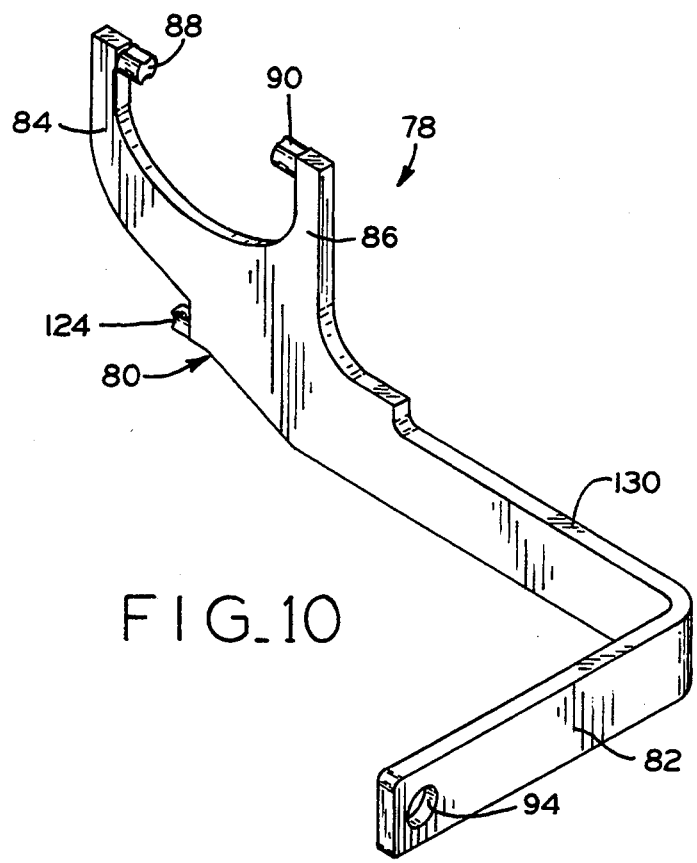
FIG_10

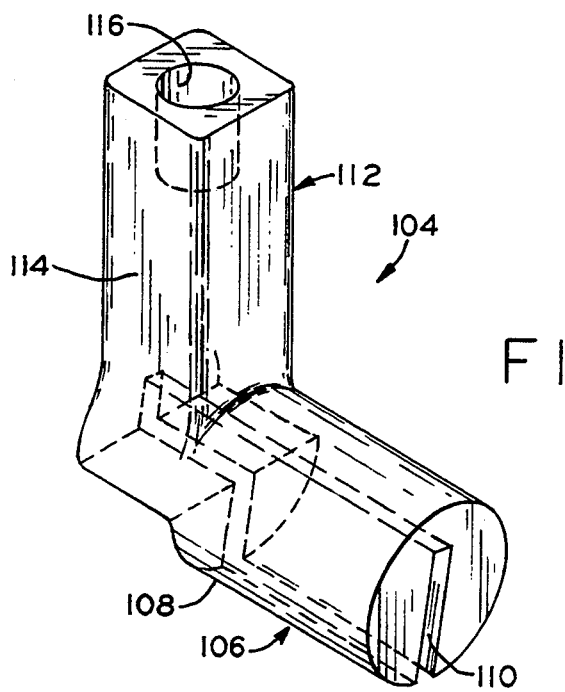
FIG_11
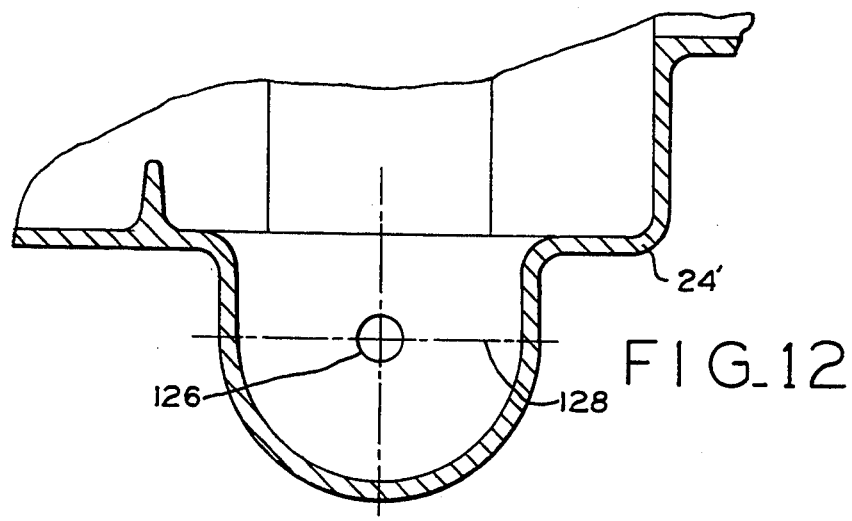
FIG_12
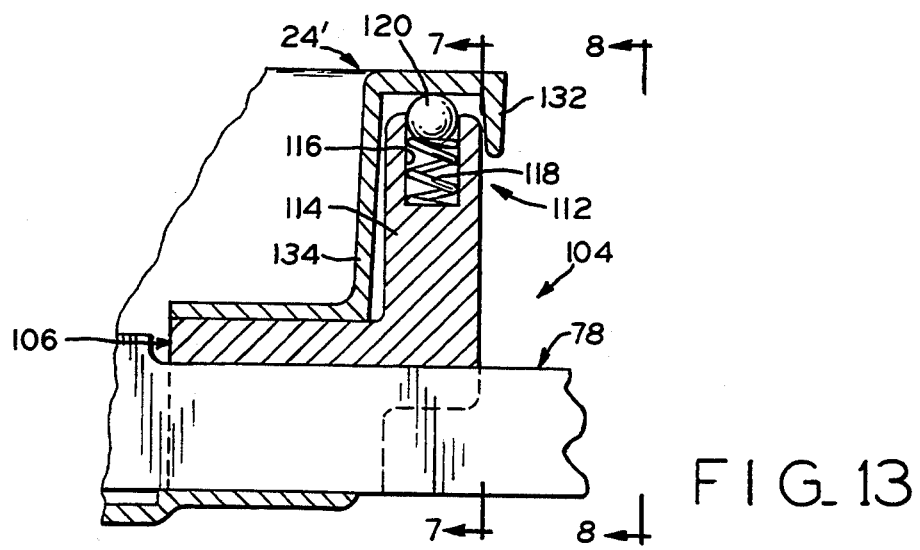
FIG_13

SHIFT LEVER ARRANGEMENT FOR TRANSAXLE

BACKGROUND OF THE INVENTION

1. Field of the Invention

The invention relates to transmission shifting mechanisms for small transaxles such as used in riding lawn mowers and the like. More specifically, the field of the invention is that of small transaxles having a shift lever arrangement for changing the gear ratio of an in-line shift transmission.

2. Prior Art

A transaxle having an in-line shifting mechanism is disclosed in U.S. Pat. No. 4,966,574, assigned to the assignee of the present invention, the disclosure of which is explicitly incorporated by reference. In this arrangement, the input shaft is attached to a pulley which receives motion from a belt connected with the engine. The input shaft extends out the top of the transaxle and turns a bevel gear which is freely rotatable on the shift shaft. The bevel gear engages a spur gear on the counter shaft. The other spur gears of the counter shaft engage speed change spur gears which are freely rotatable on the shift shaft. A shifting mechanism is provided to select the appropriate spur gear on the shift shaft to attain the desired transmission ratio.

The shifter fork of the shifting mechanism moves keys within the shift shaft and thereby engages one of the speed change spur gears, with the keys being rotatably fixed to the shift shaft to rotatably couple the counter shaft and the shift shaft. Another gear of the shift shaft engages the ring gear of the differential for transferring the rotational motion of the shift shaft to the output axle shafts, which are driven by a speed determined according to the selected gear ratio.

Such a transaxle may include a detent biasing mechanism for positioning the shifter fork as disclosed in U.S. Pat. No. Re. 32,125, assigned to the assignee of the present invention, the disclosure of which is explicitly incorporated by reference. In the disclosed arrangement, the shifter of the shifting mechanism includes a detent plate with a peripheral edge having a series of detent seats. Another known detent arrangement includes seats which are located in the side of the detent plate. A spring and ball are disposed in the housing of the transaxle, positioned to be adjacent to the detent seats and arranged so that the ball is biased by the spring into one of the detent seats.

The shifter is connected to a manually operable control and provides sufficient "feel" so that the vehicle operator positively senses the shift positions. In these prior art transaxles, an end of the shifter extends out of the top of the transaxle housing and is connected to a mechanism which may be manipulated by the vehicle operator. Typically, the input shaft of the shifter has a square head which is attached to an elongated lever piece so that linkage of the vehicle may rotate the shifter. In the conventional top extending shifter, the operator shift control lever is positioned lower than the tractor seat and below the front panel of the vehicle. This may be a troublesome arrangement because the belt and pulley are disposed in the general area of the input shaft of the shifting mechanism, and other parts of the vehicle are often located in the general area above the transaxle housing.

Another known design for small tractors and riding lawn mowers is a "fender shift" arrangement wherein the operator shift lever is located at one side near the front of the vehicle and pivots on a horizontal axis which is perpendicular to the direction of movement of the vehicle. However, conventional shifter arrangements having the shifter extending out of the top of the housing are not easily compatible with many small tractors and riding lawn mowers having a "fender shift" design. This incompatibility may entail additional expense associated with adapting the linkage and shifter input shaft to fit within the allocated space, and such an adaptation may be unreliable when used with conventional transaxles on vehicles having the "fender shift" arrangement.

Another feature of conventional transaxles is that the detent biasing mechanism is located between the halves of the transaxle housing and must be carefully manipulated during assembly to ensure the shifter fork is properly oriented in relation to the detents and biasing mechanism. The detent biasing mechanism serves an important function in the transaxle by allowing the operator to positively sense the shift positions. However, providing a detent plate and biasing mechanism adds to the expense of the transaxle, both in terms of additional materials and manufacturing steps. The additional materials include the detent plate itself and the biasing mechanism. The additional manufacturing steps include forming the detent seats in each detent plate, assembling the biasing mechanism in the housing, and properly aligning the shifter fork between the housing halves.

What is needed is a transaxle shifter fork arrangement which is more suitable for some vehicles having the "fender shift" arrangement.

Also needed is a shifter fork arrangement with an improved detent arrangement.

SUMMARY OF THE INVENTION

The present invention is a shifter arrangement which extends out the front of the transaxle. The shifter extends out the forward portion of the transaxle housing and may be conveniently attached to a shifting mechanism which is mounted toward the front of the small tractor or riding lawn mower, such as with a "fender shift" arrangement. In the "fender shift" arrangement, the pivotal movement of the operator shift lever is easily translated to vertical motion which is applied to and pivots the shifter, and the shifter lever and linkage are disposed away from other vehicle mechanisms conventionally located about the top of the transaxle. The present invention allows the shifter to be disposed away from the pulley system located on the top of the transaxle housing and use a simpler and more reliable arrangement to manipulate the shifter. Thus, the present invention allows for more reliable linkage between the operator lever and the shifter of the transaxle.

The shifter is assembled in the transaxle through an aperture in the transaxle housing, and in one embodiment is secured by a cover which closes the aperture and forms bearings for rotatably supporting the shifter. This allows the shifter to be located below the plane defined by the split halves of the transaxle housing and to extend out the front of the housing.

Additionally, a second embodiment of the present invention includes a shifter having an integral lever extending out of the transaxle housing, thereby eliminating one of the parts of a conventional transmission linkage. The shifter has an integral lever portion which may be mounted through an opening in one of the housing halves. The integral shifter is rotatably secured within the opening by a bushing having a slot which mounts on the shifter. At the other end of the integral shifter, a pivoting pin is provided to pivotally support the shifter on the central axis of the bushing and circular opening, and the housing includes a seat portion including a bore pivotally supporting the pivoting pin in alignment with the opening. The integral shifter may be installed through a hole in the housing, and the bushing may then be attached to the shifter and capture it within the housing. Once the shifter is securely mounted in the housing, it is easily pivoted to obtain the desired shift position.

The shifter includes a detent biasing mechanism for engaging detent recesses formed in the transaxle housing. With the integral shifter, the detent biasing mechanism is located on the bushing which is mounted on the arm portion. The detent recesses are also protected by a shield and retention wall which blocks direct passage to the detent recesses and also aids in retaining the biasing mechanism within the transaxle.

The present invention, in one form, is a transaxle comprising a pair of axles, a housing rotatably supporting the axles, an input shaft extending into the housing, and a transmission for transmitting motion from the input shaft to the axles. The axles are disposed within the housing in a horizontal plane. The transmission is disposed in the housing, and includes a plurality of selectable gear ratios with an in-line shifting mechanism for selectively engaging one of the gear ratios. Also, the transaxle includes a shifter disposed within the housing and extending outside of the housing. The shifter pivots on a horizontal axis and is adapted to manipulate the in-line shifting mechanism for selectively engaging one of the gear ratios.

The present invention, in another form, is a transaxle comprising a pair of axles, a housing rotatably supporting the axles, an input shaft extending into the housing, and a transmission for transmitting motion from the input shaft to the axles. The axles are disposed within the housing in a horizontal plane. The transmission is disposed in the housing, and includes a plurality of selectable gear ratios with an in-line shifting mechanism for selectively engaging one of said gear ratios. Also, the transaxle includes a shifter having integral arm and lever portions. The arm portion is rotatably disposed within the housing and extends through an opening in the housing. The lever portion is disposed substantially transverse to the arm portion and extends from the arm portion outside the housing. The arm portion is adapted to manipulate the in-line shifting mechanism for selectively engaging one of the gear ratios whereby movement of the lever portion rotates the arm portion to manipulate the in-line shifting mechanism.

One object of the present invention is to provide a transaxle shifter fork arrangement which is more suitable for some vehicles having a "fender shift" arrangement.

Also an object is to provide a shifter fork arrangement with an improved detent arrangement.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 1 is a perspective view of the transaxle of the present invention.

FIG. 2 is a side view, in partial cross-section, of the shifter fork in the transaxle housing.

FIG. 3 is a top view of the shift shaft, shifter fork, and lower housing.

FIG. 4 is a front elevational view, in partial cross-section, of the pivoting arc of the shifter fork.

FIG. 5 is a perspective view of a second embodiment of the transaxle coupled with fender shift linkage of a lawn and garden tractor or a riding mower.

FIG. 6 is a top view, in partial cut-away, of the second embodiment of the shifter in the transaxle housing.

FIG. 7 is a view taken along view line 7—7 of FIG. 13 showing the shift lever detent arrangement.

FIG. 8 is a front view taken along view line 8—8 of FIG. 13.

FIG. 9 is a side view of the transaxle of the second embodiment of the shifter.

FIG. 10 is a perspective view of the second embodiment of the shifter.

FIG. 11 is a perspective view of the bushing of the second embodiment.

FIG. 12 is a sectional view of the lower housing pivot supporting portion of the second embodiment.

FIG. 13 is a sectional view of the detent shield and retainer of the second embodiment.

Corresponding reference characters indicate corresponding parts throughout the several views. The exemplifications set out herein illustrate preferred embodiments of the invention, in one form, and such exemplifications are not to be construed as limiting the scope of the invention in any manner.

DESCRIPTION OF THE PREFERRED EMBODIMENT

The present invention relates to transaxles, and more particularly to transaxles having a transmission disposed in a split line housing. FIG. 1 shows a perspective view of transaxle 20 having upper and lower housing halves 22 and 24, respectively, which rotatably support axles 26 and 28. Upper and lower housing halves 22 and 24 join along a central, horizontal plane generally located in the middle of transaxle 20, with axles 26 and 28 being generally disposed in the central plane of transaxle 20. Input shaft 30 extends upwardly from upper housing 22, typically to connect with a pulley (not shown) or other mechanism which rotatably drives input shaft 30. Transaxle 20 receives motion from input shaft 30 which is transferred by transmission 32 to axles 26 and 28 in a well known manner, such as that disclosed in the aforementioned U.S. Pat. No. 4,966,574. Axles 26 and 28 are connected to wheels (not shown) which drive the vehicle (not shown), such as a riding lawn mower, in a forward or reverse direction as indicated by arrow A.

In accordance with the present invention, transaxle 20 includes shifter 34 which extends from the front of lower housing half 24. Referring to FIGS. 2-4, shifter fork 34 is located between lower housing 24 and cover plate 36 so that attachment head 38 of shifter fork 34 extends out the front side of transaxle 20. Attachment head 38 has a square shape and includes bore 40, which may be connected to lever 41 by bolt 43 so that linkage (not shown in FIGS. 1-4) from an operator lever (not shown in FIGS. 1-4) may be connected to shifter fork 34, similarly to the embodiment of FIG. 5. Bearings 42 and 44 are formed between cover plate 36 and lower housing 24 to provide rotational support for cylindrical portion 46 of shifter fork 34 below the central plane of the transaxle housing. Engaging portion 48 extends from cylindrical portion 46 and includes arms 50 and 52 for manipulating shift collar 54 by engaging and axially moving shift collar 54 along shift shaft 56. The position of shift collar 54, which is moved by shifter fork 34, determines the transmission ratio of transaxle 20.

Shifting of transaxle 20 occurs within axial channels 58 of shift shaft 56. Shift shaft 56 slidably supports shift collar 54 which is connected with keys 60 disposed within axial channels 58. Similar to the shifting mechanism described in the aforementioned U.S. Pat. No. 4,966,574, shift collar 54 may move on shift shaft 56 to selectively engage one of spur gears 62 disposed on shift shaft 56 by moving keys 60 into engagement with internal recesses 62.1 of one of spur gears 62. Engaging portion 48 is able to axially move shift collar 54 over shift shaft 56 by means of pins 64 and 66 of arms 50 and 52, respectively, abutting annular groove 68 of shift collar 54. Shifter fork 34 may be pivoted over a substantial angle (see the dotted representations of shifter fork 34 and shift collar 54 in FIG. 4) resulting in the axial movement of shift collar 54. Detent recesses 70 are formed in lower housing 24 so that detent biasing mechanism 72 engages keys 60 with a selected one of spur gears 62. A similar detent biasing mechanism is disclosed in U.S. Pat. No. 5,094,121, entitled "SHIFTING MECHANISM DETENT ARRANGEMENT" filed Aug. 1, 1991, U.S. Ser. No. 07/738,825, assigned to the assignee of the present invention, the disclosure of which is explicitly incorporated by reference.

Shifter fork 34 is assembled into lower housing 24 by extending engaging portion 48 through aperture 74 of lower housing 24 and abutting cylindrical portion 46 with the portions of bearings 42 and 44 formed in lower housing 24. Next, cover plate 36 is placed adjacent to lower housing 24 to cover aperture 74 and abut cylindrical portion 46. Finally, bolts 76 are used to secure cover plate 36 to lower housing 24 and thereby locate cylindrical portion 46 within bearings 42 and 44 formed between lower housing 24 and cover plate 36. Head 38 may then be attached to lever 41 or another mechanism to receive motion from linkage (not shown in FIGS. 1-4) of the vehicle. Further, bore 40 may receive a fastener such as bolt 43 to secure lever 41 to head 38. Thus, shifter fork 34 is located through aperture 74 and is secured by cover plate 36 to extend out the front of transaxle 20 through bearing 42, and is connected with lever 41 for connection with an operator's shift control.

A second embodiment of the present invention is shown in FIGS. 5-13. Shifter 78 of the second embodiment is a single piece, preferably of sheet metal, pivotally disposed in lower housing 24', and includes shift collar engaging portion 80 and lever portion 82. Engaging portion 80 includes arms 84 and 86 which have pins 88 and 90, respectively, for engaging shift collar 54 to cause axial movement over shift shaft 56. Opposite engaging portion 80, shifter fork 78 extends through opening 92 of lower housing 24' wherein for the "fender shift" arrangement opening 92 is located below the central plane of the transaxle. However, opening 94 may be formed in upper housing 22, so that shifter fork 78 would operate in a mirror image, and may be more compatible with a console shift arrangement as described below.

Shifter fork 78 is bent and extends perpendicularly in relation to the pivoting axis of engaging portion 80 to form lever portion 82. Lever portion 82 may move in a plane of rotation which is substantially perpendicular to the pivoting axis of engaging portion 82. Opening 94 is located at an end of lever portion 82 and is for attaching to linkage 96 of an operator shift lever having a fender shift arrangement as shown in FIG. 5.

Fender shift arrangements are increasingly common in small tractors and riding mowers, and many designs of such vehicles are not well adapted for use with transaxles having the shifter fork extending out the top of the transaxle. To accommodate such vehicles, linkage 96 includes operator fender shift lever 98 which is rotatably connected with linkage shaft 100. Coupling 102 is attached to linkage shaft 100 and to opening 94 of shifter fork 78 and translates the pivoting movement of fender shift lever 98 to movement along a vertical arc B (see FIG. 8) which pulls lever portion 82 up and down thus pivoting shifter fork 78. Operator fender shift lever 98 is typically forwardly disposed on the vehicle so that connecting shifter fork 78 with linkage 96 is greatly facilitated. In this manner, the plane of rotation of lever portion 82 is in parallel alignment with linkage shaft 100 and removed from other parts of the vehicle, particularly the belt and pulley drive system.

In order for shifter fork 78 to be able to rotate within opening 92 of lower housing 24', bushing 104 is mounted on shifter fork 78. Referring to FIGS. 7, 8, and 11, bearing portion 106 of bushing 104 includes a circular outer surface 108 which abuts the portion of lower housing 24' that defines opening 92. In addition, bearing portion 106 includes a generally rectangularly shaped slot 108 shaped to receive shifter fork 78. Bushing 104 captures shifter fork 78 and prevents shifter fork 78 from escaping from lower housing 24'.

Bushing 104 also includes an integrally formed detent biasing mechanism 112. Biasing mechanism 112 includes body 114 radially extending from bearing portion 106, with bore 116 located in body 114 and being shaped to house spring 118 and ball 120 which engage detent recesses 122 formed in lower housing 24'. Thus, bushing 104 provides rotational support for shifter fork 78 within opening 92 by bearing portion 106, and also selectively positions shifter fork 78 by the engagement of detent biasing mechanism 112.

Shifter fork 78 is also supported at one end by pivot pin 124 which is positioned in bore 126 of lower housing 24', see FIG. 12. Intersecting lines 128 intersect at a point which lies on a line projected from along the axial center of bearing portion 106 of bushing 104, so that shifter fork 78 is properly seated and aligned with the axial center of opening 92 for pivoting therein. Optionally, a slot shaped seat may be formed in lower housing 24' and pivot pin 124 may be located in the seat and secured by a clamp, a further portion of the housing, or a similar arrangement (not shown) to be securely retained. As shown in FIG. 10, pivot pin 124 is located above the midpoint of intermediate portion 130 which connects engaging portion 80 and lever portion 82. The bottom of engaging portion 80 slants upwardly from intermediate portion 130 to pivot pin 124 thereby conforming to the shape of lower housing 24' which includes a gradual rise of the inner surface of lower housing 24' to bore 126. By the arrangement of bushing 104, pivot pin 124, and bore 126, shifter fork 78 may rotate within housing 24' in a manner similar to a shifter fork having a cylindrical rod, but shifter fork 78 is less expensive in terms of manufacturing materials and complexity.

In another aspect of the invention best shown in FIG. 13, lower housing 24' includes detent shield and retainer portion 132 for protecting and retaining bushing 104. Shield 132 is a wall cast as part of lower housing 24' and generally blocks direct communication from the front of the transaxle to the detent recesses 122. To insert bushing 104 into housing 24', slot 110 is mounted on intermediate portion 130 and body 114 is guided through assembly recess 136. Once bushing 104 is inserted, body 114 is securely held between shield 132 and front wall 134 because shifter fork 78 is not ordinarily moved to the position of assembly recess 136 during operation of the transmission. Shifter fork 78 may not move out of housing 24' because larger engaging portion 80 may not traverse through slot 108 of bushing 104; further, shifter fork may not move into lower housing 24' because the bend connecting lever portion 82 and intermediate portion 130 prevents traversal through slot 108.

In the first preferred embodiment, shifter fork 34 preferably comprises a rod portion and a body portion of flat stamped sheet material which are connected by brazing or other suitable method. Shifter fork 78 of the second preferred embodiment is preferably made of plate material having a thickness of about 3/16 inches, and formed as a flat stamping as shown in FIG. 10. Bushing 104 is preferably made of a plastic material such as reinforced nylon and the like. The opening in the housing through which the shifter extends may be formed by machining the housing after casting, or alternatively a slotted portion may be formed in the casting and an insert attached to define such an opening.

The housing opening may be formed in either the lower or the upper housing. If the shifter is disposed above the shift shaft and the opening is formed in the upper housing, the shifter operates as a mirror image of the disclosed lower housing shifter. This mirror image would be easily compatible with a console shift arrangement, wherein the operator shift lever is disposed below the operator seat on the vehicle and moves the shifter in the opposite rotational direction than the fender shift arrangement. The present invention's placement of the shifter through a hole in the upper housing may be used in combination with the console shift lever.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A transaxle comprising:
   a pair of axles defining an axis of rotation, said axles disposed in a horizontal plane extending through said axis;
   a housing rotatably supporting said axles;
   an input shaft extending into said housing;
   transmission means for transmitting motion from said input shaft to said axles, said transmission means being disposed in said housing, said transmission means including a plurality of selectable gear ratios and in-line shifting means for selectively engaging one of said gear ratios; and
   a shifter disposed within said housing and extending outside of said housing in an arrangement which does not increase the height of said transaxle above said horizontal plane, said shifter being pivotable on a horizontal axis, and said shifter adapted to manipulate said in-line shifting means for selecting one of said gear ratios.

2. A transaxle comprising:
   a pair of axles extending in a horizontal plane;
   a housing rotatably supporting said axles and a cover secured to said housing, said housing including an aperture located at a bottom of said housing;
   an input shaft extending into said housing;
   transmission means for transmitting motion from said input shaft to said axles, said transmission means being disposed in said housing, said transmission means including a plurality of selectable gear ratios and in-line shifting means for selectively engaging one of said gear ratios;
   a shifter disposed within said housing and extending outside of said housing, said shifter being pivotable on a horizontal axis, and said shifter adapted to manipulate said in-line shifting means for selecting one of said gear ratios; and
   said cover adjacent to said aperture and supporting said shifter, said cover and said housing providing a bearing for said shifter.

3. The transaxle of claim 2 wherein said lower housing portion includes a plurality of internal detent recesses located at positions corresponding respectively to gear ratios of said transaxle, and said shifter includes means for engaging said internal detent recesses of said housing to maintain engagement of said transmission means with a selected one of said gear ratios.

4. The transaxle of claim 2, wherein said shifter comprises a single piece of sheet metal defining an arm portion and a lever portion, and further comprising a bushing mounted on said arm portion, said bushing rotatably supporting said arm portion in said housing aperture.

5. The transaxle of claim 4 wherein said bushing includes means for preventing said shifter from moving through said opening.

6. The transaxle of claim 4 wherein said arm portion includes a pivoting pin aligned with a central axis of said bushing.

7. The transaxle of claim 4 wherein said bushing is comprised essentially of nylon.

8. The transaxle of claim 2 wherein said shifter comprises a single piece of sheet metal defining an arm portion a and lever portion, said arm and lever portions connected by a bend portion of said shifter.

9. The transaxle of claim 2 wherein said housing comprises an upper and lower portion, said upper and lower portions joining along a central plane of said transaxle, and said shifter is spaced from and parallel to said central plane of said transaxle.

10. The transaxle of claim 9 wherein said transmission means includes a plurality of shafts rotatably disposed in said central plane within said housing, one of said shafts being a shift shaft having a plurality of gears rotatably disposed thereon, each of said gears associated with one of said selectable gear ratios.

11. The transaxle of claim 10 wherein said shift shaft includes an axial channel and said gears include internal recesses, and said shifting means includes a key movably disposed in said axial channel, said key adapted to selectively engage one of said internal recesses of said gears.

12. A transaxle comprising:
a pair of axles extending in a horizontal plane;
a housing rotatably supporting said axles and including a vertically facing opening;
an input shaft extending into said housing;
transmission means for transmitting motion from said input shaft to said axles, said transmission means being disposed in said housing, said transmission means including a plurality of selectable gear ratios and in-line shifting means for selectively engaging one of said gear ratios; and
a shifter disposed within said housing and extending through said opening and outside of said housing, said shifter being pivotable on a horizontal axis, and said shifter adapted to manipulate said in-line shifting means for selecting one of said gear ratios.

13. The transaxle of claim 12 wherein said housing comprises an upper and lower portion, said upper and lower portions join along a central plane of said transaxle, and said shifter is spaced from and parallel to said central plane of said transaxle.

14. The transaxle of claim 13 wherein said transmission means includes a plurality of shafts rotatably disposed in said central plane within said housing, one of said shafts being a shift shaft having a plurality of gears rotatably disposed thereon, each of said gears associated with one of said selectable gear ratios.

15. The transaxle of claim 14 wherein said shift shaft includes an axial channel and said gears include internal recesses, and said transmission means includes a key movably disposed in said axial channel, said key adapted to selectively engage one of said internal recesses of said gears.

16. The transaxle of claim 12 wherein said shifter includes an integrally formed lever portion extending outside said housing, said shifter includes an elongate rail portion adapted to engage said transmission means, and said lever portion is transversely positioned in relation to said rail portion.

17. The transaxle of claim 16 wherein said shifter comprises sheet material and said rail and lever portions are connected by a bend of said sheet material.

18. The transaxle of claim 16 wherein said rail portion includes a pin and said housing includes a seat adapted to pivotally support said pin.

19. The transaxle of claim 12 further comprising a bushing, said bushing mounted on said shifter and rotatably supporting said shifter in said opening.

20. The transaxle of claim 19 wherein said bushing includes means for preventing said shifter from moving through said opening.

21. The transaxle of claim 19 wherein said housing further includes a plurality of internal detent recesses located at positions corresponding respectively to gear ratios of said transmission means, and said bushing including means for engaging said internal detent recesses of said housing to maintain engagement of said transmission means with a selected one of said gear ratios.

22. The transaxle of claim 21 wherein said housing further includes a wall adjacent to said detent recesses for retaining said bushing within said housing.

23. The transaxle of claim 19 wherein said bushing is comprised essentially of nylon.

24. A transaxle comprising:
a pair of axles disposed in a horizontal plane;
a housing rotatably supporting said axles;
an input shaft extending into said housing;
transmission means for transmitting motion from said input shaft to said axles, said transmission means being disposed in said housing, said transmission means including a plurality of selectable gear ratios and in-line shifting means for selecting one of said gear ratios; and
a shifter having integral arm and lever portions, said shifter comprising a single piece of sheet metal, said arm portion being rotatably disposed within said housing and extending through an opening in said housing, said lever portion being disposed substantially transverse to said arm portion and extending from said arm portion outside said housing, said arm portion adapted to manipulate said in-line shifting means for selectively engaging one of said gear ratios whereby movement of said lever portion rotates said arm portion to manipulate said in-line shifting means.

25. A transaxle comprising:
a pair of axles disposed in a horizontal plane;
a housing rotatably supporting said axles;
an input shaft extending into said housing;
transmission means for transmitting motion from said input shaft to said axles, said transmission means being disposed in said housing, said transmission means including a plurality of selectable gear ratios and in-line shifting means for selecting one of said gear ratios;
a shifter having integral arm and lever portions and a bushing mounted on said arm portion, said bushing disposed within an opening in said housing, said arm portion being rotatably disposed within said housing and extending through said opening in said housing, said lever portion being disposed substantially transverse to said arm portion and extending from said arm portion outside said housing, said arm portion adapted to manipulate said in-line shifting means for selectively engaging one of said gear ratios whereby movement of said lever portion rotates said arm portion to manipulate said in-line shifting means; and
detent recesses in said housing located at positions corresponding respectively to gear ratios of said shifting means, said bushing including means for engaging said detent recesses to maintain engagement of said shifting means with a selected one of said gear ratios.

26. The transaxle of claim 25 wherein said housing further includes a wall adjacent to said detent recesses for retaining said bushing within said housing.

* * * * *